(No Model.)
J. C. PRUET.
HORSE POWER.
No. 403,372. Patented May 14, 1889.
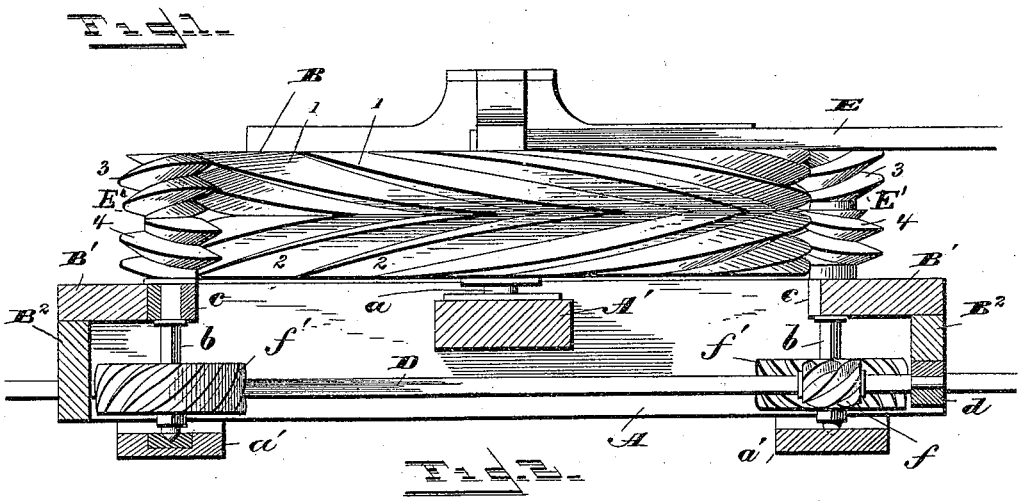
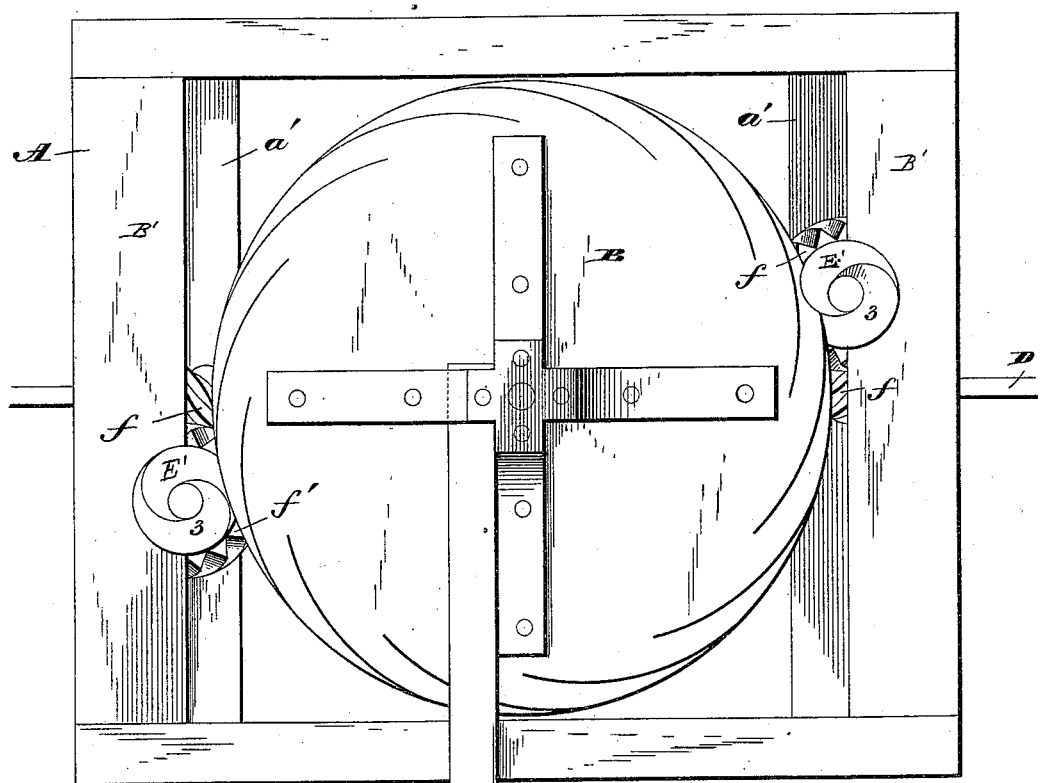
WITNESSES,
G. S. Elliott,
E. W. Johnson
John C. Pruet.
INVENTOR
by 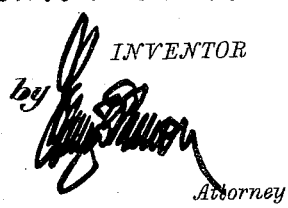
Attorney

UNITED STATES PATENT OFFICE.

JOHN C. PRUET, OF EL DORADO SPRINGS, MISSOURI.

HORSE-POWER.

SPECIFICATION forming part of Letters Patent No. 403,372, dated May 14, 1889.

Application filed January 31, 1889. Serial No. 298,203. (No model.)

*To all whom it may concern:*

Be it known that I, JOHN C. PRUET, a citizen of the United States of America, residing near El Dorado Springs, in the county of Cedar and State of Missouri, have invented certain new and useful Improvements in Horse-Powers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in horse-powers or other analogous machinery; and the leading feature of my improvement consists in the combination of a master or power wheel the periphery of which is provided with grooves or threads disposed to provide a right and left pitch, with pinions having threads pitched right and left which engage with the opposed grooves of the master-wheel, and a counter-shaft connected to the shafts of said pinions by worm-gear.

In the accompanying drawings, Figure 1 is a sectional view showing my improvement applied to a horse-power. Fig. 2 is a plan view.

A refers to a suitably-constructed supporting-frame which has a central cross-piece, A', from which projects a vertical pin, $a$, upon which the master-wheel B is placed. The frame is also provided with cross-pieces $a'$, which form supports for the bearings of the lower ends of the shafts $b\,b$, said shafts also being supported by bearings $c\,c$ attached to the cross-pieces B' of the frame. The end pieces, B$^2$, of the frame are provided with suitable bearings, $d$, which support a shaft, D, which may be the driving-shaft.

To the upper surface of the master-wheel is attached a sweep, E, to which a horse may be attached when the device is used as a horse-power; or a crank-handle may be secured thereto when it is desired to employ the same for driving light machinery.

The master-wheel B is provided on its periphery with a series of V-shaped grooves, 1 1, which extend from the edge of the master-wheel to the center, and at the center these grooves 1 1 intersect similar though oppositely-arranged grooves 2 2, which have the same angle as the grooves 1, thereby providing the master-wheel on its periphery with a series of opposed threads. These opposed threads, formed by the grooves or recesses 1 and 2, engage with the threads 3 and 4 of pinions E', secured to the shafts $b\,b$. The shafts $b\,b$ are arranged on opposite sides of the counter-shaft D, and preferably on opposite sides of the master-wheel, as shown, and when the master-wheel is turned these shafts will be caused to rotate in the same direction. By this arrangement of parts the rotation of the master-wheel causes the shaft $b$ to be rotated very rapidly, and the opposite threads prevent the master-wheel having a tendency to rise upon its bearing-pin when turned in one direction, or be forced against its bearing when turned in the opposite direction, thereby overcoming and avoiding loss of power by undue friction.

The driving-shaft D is provided with worms $f\,f$, with which the worm-wheels $f'\,f'$, attached to the lower portions of the shafts $b\,b$, engage to rotate said shaft.

I am aware that prior to my invention single-threaded screw-shafts and single-threaded master or worm wheels have been used and combined to form a horse-power, and I do not claim such, broadly; but

What I claim as new, and desire to secure by Letters Patent, is—

1. The combination, substantially as described, of the master-wheel having oppositely-inclined V-shaped grooves 1 and 2 extending from the center of the periphery to the respective edges, two similarly-grooved pinions mounted to mesh with the master-wheel and having the lower ends of their shafts fitted with worm-wheels, a counter-shaft arranged between the worm-wheels and provided with a worm or worms to engage said wheels, and a sweep secured to the upper face of the master-wheel.

2. The combination, substantially as described, of the master-wheel having oppositely-inclined grooves, the two similarly-grooved pinions engaging the master-wheel at diametrically-opposite points and having their shafts fitted near their lower ends with worm-wheels, the counter-shaft mounted between the worm-wheels and fitted with worms to engage therewith, and a sweep secured to the upper face of the master-wheel.

In testimony whereof I affix my signature in presence of two witnesses.

JOHN C. PRUET.

Witnesses:
W. P. CRUCE,
W. H. CRUCE.